United States Patent [19]

Disselkoen

[11] 4,400,837
[45] Aug. 30, 1983

[54] QUEEN BEE MATING NUCLEUS

[76] Inventor: Mel Disselkoen, 1941 Alba SW., Wyoming, Mich. 49509

[21] Appl. No.: 290,614

[22] Filed: Aug. 6, 1981

[51] Int. Cl.³ .............................................. A01K 49/00
[52] U.S. Cl. ................................................. 6/1; 6/9
[58] Field of Search ........................... 6/1, 7, 9, 12 M; 206/407, 445

[56] References Cited

U.S. PATENT DOCUMENTS

| | | | |
|---|---|---|---|
| 1,502,278 | 7/1924 | Stevens | 6/7 |
| 1,727,078 | 9/1929 | Pinard | 6/9 |
| 2,146,844 | 4/1939 | Panei | 6/10 |
| 2,593,296 | 4/1952 | Green | 6/1 X |
| 3,468,289 | 9/1969 | Broida | 119/15 |
| 3,831,739 | 8/1974 | Hartmann | 206/445 X |
| 3,936,894 | 2/1976 | Barber | 6/11 |
| 4,185,343 | 1/1980 | Ross | 6/10 |
| 4,216,557 | 8/1980 | Golde | 6/10 |
| 4,234,985 | 11/1980 | Pierce | 6/10 |

FOREIGN PATENT DOCUMENTS

| | | | |
|---|---|---|---|
| 96429 | 10/1922 | Switzerland | 6/1 |
| 715073 | 2/1980 | U.S.S.R. | 6/1 |

*Primary Examiner*—Robert P. Swiatek
*Attorney, Agent, or Firm*—Waters, Lesniak & Willey

[57] ABSTRACT

A queen bee mating nucleus is provided which includes a housing and a removeable cover, with the cover having at least one bee ingress and egress opening therein. A removeable honeycomb rack is positioned lengthwise in the housing and carries a plurality of honeycombs perpendicular to its length with the honeycombs being parallel with each other. The honeycombs are centered in the housing spaced from the interior sidewalls of the housing to permit bees to move freely around the honeycombs carried by the rack. In addition, the rack spaces honeycombs carried thereby to permit bees to move freely between the honeycombs.

5 Claims, 8 Drawing Figures

U.S. Patent  Aug. 30, 1983  Sheet 2 of 2  4,400,837
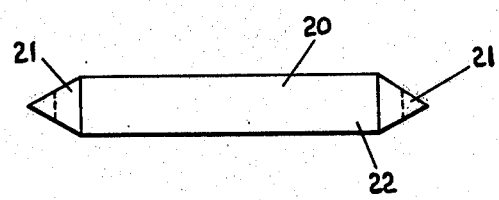
FIG. 5
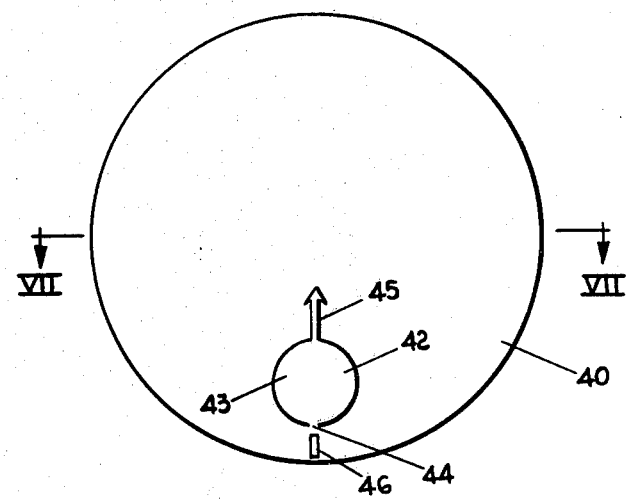
FIG. 6
FIG. 7
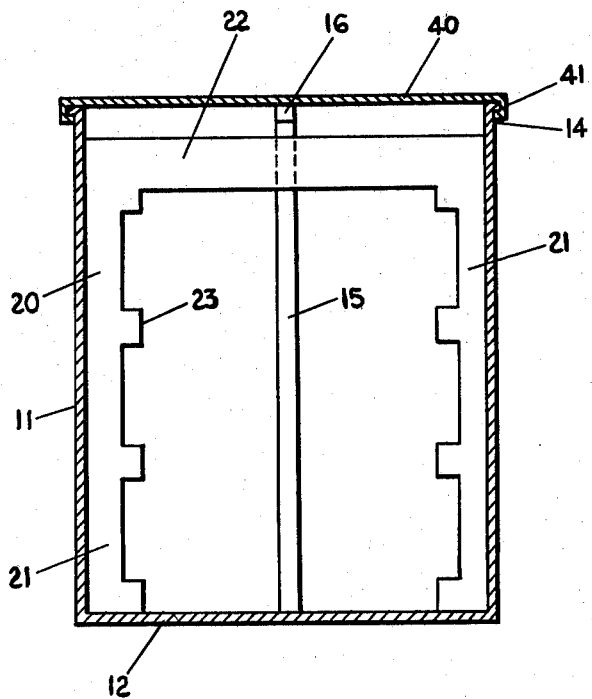
FIG. 8

QUEEN BEE MATING NUCLEUS

BACKGROUND OF THE INVENTION

1. Field of the Invention

The present invention relates to the cultivation of queen bees, and, more particularly, to a queen bee mating nucleus.

2. Description of the Prior Art

In the bee and honey industry, it is desirable to have the bees produce honey in a commercially salable size. One known way of doing this is to provide the bees with a circular plastic rim. The bees fill the rim with honeycomb and honeycomb honey. The rim is then covered at both ends with a plastic cover, labeled and sold. There is no need to cut, modify or otherwise process the honey, so compliance with Federal regulations relating to process foods are not applicable.

In some instances, these rims are not completely filled by the bees with honey leaving a unit that is deficient in weight or appearance. Currently, the honey is removed from the rims in these units and melted down to liquid honey which defeats the goal of producing honey in a honeycomb.

Another aspect of the bee industry is the cultivation of queen bees. There is a ready market for queen bees for hives that do not have one. The queen bees are cultivated by placing a queen egg or cell and a small number of worker bees in a relatively small nucleus of honeycombs. When the queen emerges, she thrives in the relatively small nucleus of bees and honeycomb until she is ready for sale. She is then placed in a box or cage and sold.

While a wide variety of structures have been employed for the nucleus, they have been generally unsatisfactory. Many have been complicated and costly. For example, U.S. Pat. No. 3,936,894 discloses an artificial nest for hatching bees which includes the use of a multiplicity of thin wood boards each having parallel grooves in one face from edge to edge thereof. The boards are then held together by one or more rods extending through the boards. Not only is such a unit expensive to manufacture and cumbersome to assemble, it requires disassembly for periodic cleaning.

Other attempts at producing mating nuclei include the use of wooden boxes with rectangular sections of honeycombs being stacked therein. A problem with this type of device is that it requires specially prepared or cut pieces of honeycomb. Other known devices require special means of introducing the honeycomb into the mating nucleus.

It is an object of the present invention to provide a simple and economical queen bee mating nucleus which is especially adapted to utilize the defective honeycomb rings which have heretofore been inefficiently melted down for liquid honey.

SUMMARY OF THE INVENTION

According to the present invention there is provided a queen bee mating nucleus which is simple and economical and which is ideally suited to use defective honeycomb rings. The unique nucleus comprises a housing having side walls, a closed back and an open front. The open front is closed by a removable cover which has at least one bee ingress and egress opening therein, preferably with an integral hinged cap. A cylindrical housing is preferred.

A removable honeycomb rack is positioned lengthwise in the housing with means to carry a plurality of honeycombs perpendicular to its length with the honeycombs parallel with each other. The preferred rack comprises a rectangular frame which is slidable lengthwise in and out of the housing with the frame having a pair of parallel side frame members, a front cross member connecting the side frame members at one end thereof and a plurality of pairs of opposing interior legs on the side frame members to space honeycombs carried by the rack from each other and from the back of the housing.

Means are provided for centering the honeycombs in the housing spaced from the interior side walls thereof to permit bees to move freely around the honeycombs carried by the rack. Preferably, the centering means comprises at least two longitudinal ribs on the interior side wall of the housing.

The housing and the cover of the preferred queen bee mating nucleus are made of plastic.

BRIEF DESCRIPTION OF THE DRAWINGS

FIG. 5 is a plan view of the rack;

FIG. 6 is a plan view of the cover with the opening cap closed;

FIG. 7 is a cross-sectional view of the cover taken along the line VII—VII of FIG. 6 with the opening cap open; and FIG. 8 is a side cross-sectional view of the queen bee mating nucleus with the honeycombs removed.

DETAILED DESCRIPTION OF PREFERRED EMBODIMENTS

Figure 1:
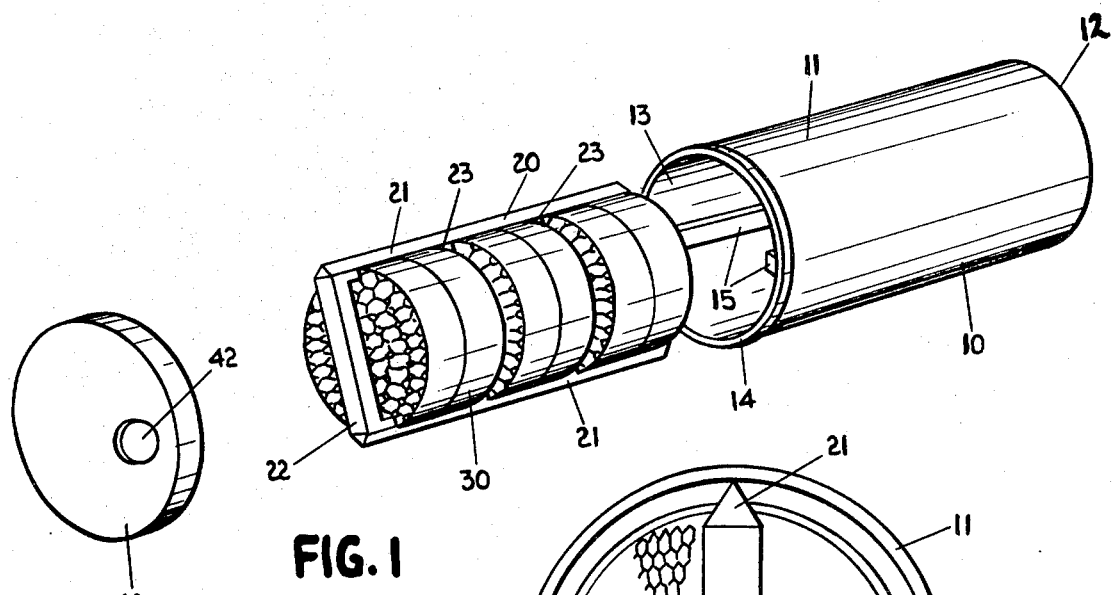
FIG. 1 is an exploded perspective view of the queen bee mating nucleus of the present invention.

Referring to the drawings in greater detail, the queen bee mating nucleus of the present invention is most clearly shown in FIG. 1. As shown, the nucleus includes housing 10, rack 20, carrying three circular honeycomb rings 30, and cover 40.

While housing 10 can be of a variety of cross-sectional configurations, such as square, rectangular or triangular, it is preferred that housing 10 be cylindrical as shown in FIG. 1. Housing 10 has side wall 11, back 12 and front opening 13. A circumferencial lip 14 is provided around the front of housing 10 so that cover 40 can be held securely in place by snapping corresponding lip 41 of cover 40 over lip 14 on housing 10. As shown in FIGS. 1, 2, 3, and 8, housing 10 has a pair of longitudinal centering ribs 15 on the interior side wall thereof to space honeycombs rings 30 from the side wall of housing 10. Preferably, the leading ends 16 of ribs 15 are beveled to facilitate sliding rack 20 into housing 10 when it is filled with honeycomb rings 30. Also, a spacing from the sidewall of about one-quarter to one-half inch is preferred.

Cover 40 includes an opening 42 to permit bee ingress and egress from the nucleus. Preferably, both cover 40 and housing 10 are made of plastic. Also preferably, opening 42 has an integral hinged cap 43 as shown in FIGS. 6 and 7. When cover 40 is made of flexible plastic, cap 43 is easily made by cutting out the outline shown in FIG. 6 to provide a living hinge 44 and an integral arrow headed retaining tab 45. A slot 46 is also cut into cover 40 to receive and hold the arrow head of tab 45 when the cap is open as shown in FIG. 7. When cap 43 is open, it also serves as a bee landing platform.

Figures 2, 4:
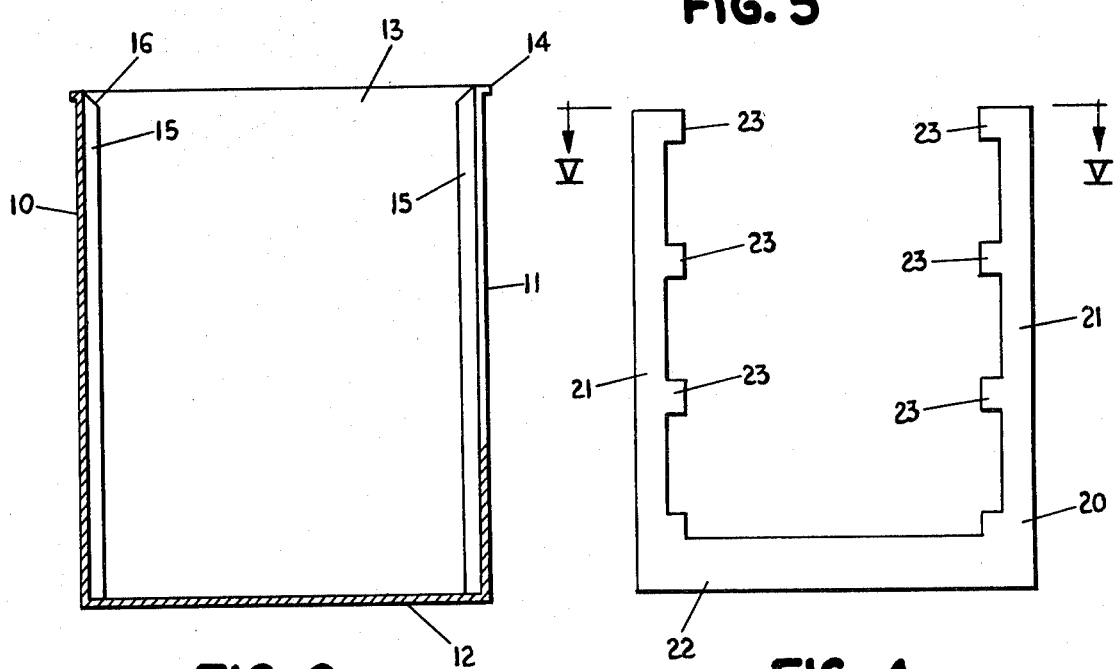
FIG. 2 is a side cross-sectional elevational view of the housing taken along the line II—II of FIG. 3 with the rack and honeycombs removed.
FIG. 4 is a side elevational view of the rack.

Rack 20, which is shown most clearly in FIG. 1 and FIG. 4, is designed to be positioned lengthwise in housing 10 with means to carry a plurality of honeycombs 30 perpendicular to its length with the honeycombs parallel with each other. Preferably, rack 20 is a rectangular frame which is slidable lengthwise in and out of housing 10. As shown in FIG. 1 and FIG. 4, the rectangular frame includes a pair of parallel side frame members 21 and a front cross member 22 connecting side frame members 21 at one end thereof. Cross member 22 also serves as a handle to facilitate sliding rack 20 in and out of housing 10.

Figure 3:
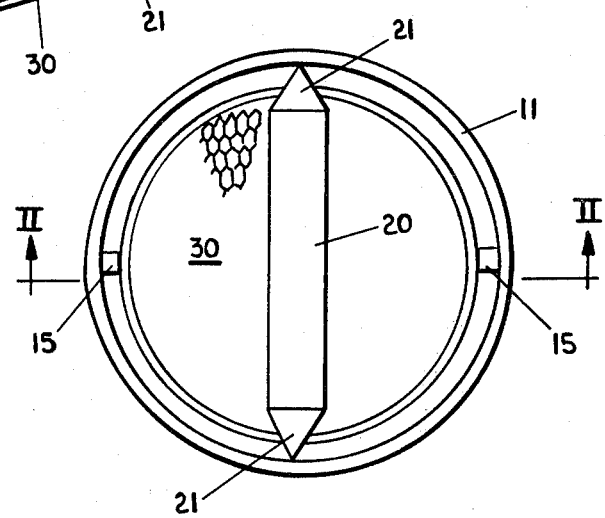
FIG. 3 is a plan view of the queen bee mating nucleus with the cover removed.

A plurality of pairs of opposing interior legs 23 are provided on side frame member 21 which space the honeycombs carried by rack 20 from each other and from the back of the housing. Front cross member 22 spaces the top honeycomb 30 from the front of the housing. Side frame members 21 and ribs 15 space honeycombs 30 from the side walls 11 of housing 10, as shown in FIG. 3. Preferably, the exterior edges of side frame members 21 are beveled to provide for easier sliding of rack 20 in and out of housing 10. While rack 20 can be made from a variety of materials, wood and plastic are preferred.

In addition, it is preferred that the angle between side frame members 21 and front cross-member 22 is slightly less than 90° so that side frame memeners 21 must be urged apart slightly to insert honeycomb rings 30. This spring action of side members 21 more securely holds honeycomb rings 30 in place in rack 20.

In use, a queen bee egg or cell is placed in housing 10 along with a small number of worker bees, Rack 20 is loaded with honeycombs 30 and is slid into housing 10 to the position shown in FIG. 3. Cover 40 is then snapped securely in place with lip 41 engaging housing lip 14. Opening 42 in cover 40 permits ingress and egress of the queen bee and other queen bees. Because of the spacing between the honeycombs provided by legs 23 on rack 20 and the spacing between side wall 11 and honeycomb ring 30 provided by ribs 15 and side frame members 21, the bees are free to move freely around the honeycombs within the housing 10. After a predetermined period of time, the queen bee is ready for removal. Cover 40 is taken off, and the queen bee is taken out and prepared for sale. Alternatively, the queen bee can be left in the mating nucleus, which can be used to transport the queen bee to her destination. Once the queen bee is removed, honeycomb rings 30 may be replaced if necessary and the entire process started again.

Thus, the queen bee mating nucleus of the present invention is simple, compact and inexpensive and can be reused time after time with no components requiring disposal. The nucleus is ideally suited to utilize defective honeycomb rings, which heretofore have been wastefully melted down to make liquid honey.

While the preferred embodiments of the present invention have been described and illustrated, it will be obvious to those skilled in the art, that various changes and modifications can be made without departing from the spirit of the present invention. For example, while the invention has been described and illustrated in terms of circular honeycomb rings, a variety of shapes of honeycomb can be utilized. While a nucleus with three honeycomb rings has been described and illustrated, any number of rings can be utilized depending upon the size of nucleus which is desired. Legs or a stand can be provided on housing 10 for placement of the nucleus in the field. In addition, in the case of hot climates, housing 10 and cover 40 can be perforated for air ventilation. Also, a feeder can be provided for a sugar solution or the like either inside the nucleus or on the outside with a feeder opening in the housing. Accordingly, the scope of the present invention is deemed to be limited only by the appended claims.

The embodiments of the invention in which an exclusive property or privilege is claimed are defined as follows:

1. A queen bee mating nucleus comprising:
    a housing having side walls, a closed back and an open front;
    a removable cover on said open front, said cover having at least one ingress and egress opening therein;
    a removable honeycomb rack positioned lengthwise in said housing with means to carry a plurality of honeycombs perpendicular to its length with the honeycombs parallel with and spaced from each other, said rack being slidable lengthwise in and out of said housing and surrounding two diametrically opposite side portions of said plurality of honeycombs and at least one transverse end portion; and
    means for centering honeycombs in said housing spaced from the interior side walls to permit bees to move freely around the honeycombs carried by said rack.

2. A queen bee mating nucleus according to claim 1 wherein said centering means comprises at least two longitudinal ribs on the interior sidewall of said housing.

3. A queen bee nucleus according to claim 1 wherein said cover opening has an integral hinged cap and means for retaining said cap in the open position.

4. A queen bee mating nucleus comprising:
    a housing having side walls, a closed back and an open front;
    a removable cover on said open front, said cover having at least one bee ingress and egress opening therein;
    a removable honeycomb rack positioned lengthwise in said housing with means to carry a plurality of honeycombs perpendicular to its length with the honeycombs parallel with and spaced from each other, said rack being slidable lengthwise in and out of said housing; and
    means for centering honeycombs in said housing spaced from the interior side walls to permit bees to move freely around the honeycombs carried by said rack and
    wherein said rack comprises a rectangular frame which is slidable lengthwise in and out of said housing, said frame having a pair of parallel side frame members, a front cross member connecting said side frame members at one end thereof and a plurality of pairs of opposing interior legs on said side frame members to space honeycombs carried by said rack from each other and from the back of said housing.

5. A queen bee mating nucleus according to claim 4 wherein said housing is cylindrical and said honeycombs are honeycomb rings.

* * * * *